US012076929B2

(12) United States Patent
Paternoster

(10) Patent No.: US 12,076,929 B2
(45) Date of Patent: Sep. 3, 2024

(54) SELECTIVE POST-EXPOSURE

(71) Applicant: EOS GmbH Electro Optical Systems, Krailling (DE)

(72) Inventor: Stefan Paternoster, Andechs (DE)

(73) Assignee: EOS GmbH Electro Optical Systems, Krailling (DE)

( * ) Notice: Subject to any disclaimer, the term of this patent is extended or adjusted under 35 U.S.C. 154(b) by 81 days.

(21) Appl. No.: 17/040,248

(22) PCT Filed: Feb. 28, 2019

(86) PCT No.: PCT/EP2019/054945
§ 371 (c)(1),
(2) Date: Sep. 22, 2020

(87) PCT Pub. No.: WO2019/201498
PCT Pub. Date: Oct. 24, 2019

(65) Prior Publication Data
US 2021/0016512 A1     Jan. 21, 2021

(30) Foreign Application Priority Data

Apr. 17, 2018   (DE) .......................... 102018205820.2

(51) Int. Cl.
*B29C 64/393*      (2017.01)
*B22F 10/366*      (2021.01)
(Continued)

(52) U.S. Cl.
CPC .......... *B29C 64/386* (2017.08); *B22F 10/366* (2021.01); *B22F 10/80* (2021.01);
(Continued)

(58) Field of Classification Search
CPC ...... B22F 10/28; B22F 10/364; B22F 10/366; B22F 10/80; B29C 64/153; B29C 64/386; B29C 64/393; B33Y 10/00; B33Y 50/02
See application file for complete search history.

(56) References Cited

U.S. PATENT DOCUMENTS 6,136,948 A      10/2000   Dickens, Jr. et al.
6,325,961 B1 *   12/2001   Beers ..................... B29C 64/40
                                                        425/375
(Continued)

FOREIGN PATENT DOCUMENTS

DE         10157647          6/2003
DE         102007024469      11/2008
(Continued)

OTHER PUBLICATIONS

International Search Report for Application No. PCT/EP2019/054945 dated Jul. 16, 2019, 2 pages.

*Primary Examiner* — Alexander M Weddle
(74) *Attorney, Agent, or Firm* — Polsinelli

(57) ABSTRACT

Disclosed is a method for providing control data for an additive manufacture device having a first step of accessing model data, and a second step of generating a data model in which a construction material layer region to be solidified during the production of an object section is specified for a construction material layer. The region to be solidified is divided into a first sub-region and a second sub-region, and a respective solidification scan of the region locations to be solidified is specified in a data model. The scan solidifying the construction material, and a repeated scan, is specified at the locations of the second sub-region but not at the locations of the first sub-region. The energy input parameter during the repeat scan is measured such that the temperature of the construction material lies above a melting temperature. The method further includes a third step of providing (Continued)

data models generated in the second step as control data for integrating into a control data set.

13 Claims, 8 Drawing Sheets

(51) Int. Cl.
| | |
|---|---|
| *B22F 10/80* | (2021.01) |
| *B29C 64/295* | (2017.01) |
| *B29C 64/386* | (2017.01) |
| *B33Y 10/00* | (2015.01) |
| *B33Y 30/00* | (2015.01) |
| *B33Y 50/02* | (2015.01) |
| *G05B 19/4155* | (2006.01) |
| *B22F 10/28* | (2021.01) |
| *B22F 10/364* | (2021.01) |
| *B22F 12/10* | (2021.01) |
| *B29C 64/153* | (2017.01) |

(52) U.S. Cl.
CPC .......... *B29C 64/295* (2017.08); *B29C 64/393* (2017.08); *B33Y 10/00* (2014.12); *B33Y 30/00* (2014.12); *B33Y 50/02* (2014.12); *G05B 19/4155* (2013.01); *B22F 10/28* (2021.01); *B22F 10/364* (2021.01); *B22F 12/10* (2021.01); *B29C 64/153* (2017.08); *G05B 2219/49031* (2013.01)

(56) References Cited

U.S. PATENT DOCUMENTS

| | | | |
|---|---|---|---|
| 2004/0217095 A1 | 11/2004 | Herzog | |
| 2006/0119012 A1* | 6/2006 | Ruatta | C23C 26/02 264/497 |
| 2009/0017220 A1* | 1/2009 | Muller | B29C 64/153 427/493 |
| 2009/0206522 A1* | 8/2009 | Hein | B22F 10/322 425/143 |
| 2014/0329953 A1* | 11/2014 | Paternoster | C08L 77/06 264/460 |
| 2015/0064048 A1* | 3/2015 | Bessac | B29C 64/153 419/29 |
| 2016/0114432 A1* | 4/2016 | Ferrar | B23K 26/342 219/76.12 |
| 2016/0236299 A1* | 8/2016 | Oberhofer | B29C 64/268 |
| 2016/0250717 A1 | 9/2016 | Kruger et al. | |
| 2018/0117713 A1* | 5/2018 | Foret | B33Y 10/00 |
| 2018/0214955 A1* | 8/2018 | Kottilingam | B22F 10/34 |

FOREIGN PATENT DOCUMENTS

| | | | | |
|---|---|---|---|---|
| DE | 102013205029 | | 9/2014 | |
| EP | 3305444 | | 4/2018 | |
| FR | 2987293 | | 2/2012 | |
| FR | 2987293 A1 * | | 8/2013 | ............ B22F 3/1055 |
| WO | 9606881 | | 3/1996 | |
| WO | 2008145316 | | 12/2008 | |
| WO | WO-2017063886 A1 * | | 4/2017 | ............ B22F 10/20 |

* cited by examiner

SELECTIVE POST-EXPOSURE

TECHNICAL FIELD OF THE INVENTION

The invention relates to a method and a device for providing control data for an additive manufacturing apparatus, a correspondingly adapted additive manufacturing method, a correspondingly adapted device for controlling an energy input unit of an additive manufacturing apparatus, a correspondingly adapted additive manufacturing apparatus and a correspondingly adapted computer program.

BACKGROUND OF THE INVENTION

Additive manufacturing apparatuses and related methods are generally characterized by the fact that objects are manufactured in them layer by layer by solidifying a shapeless building material. The solidification can be achieved, for example, by supplying thermal energy to the building material by irradiating it with electromagnetic radiation or particle radiation (e.g. laser sintering (selective laser sintering or direct metal laser sintering) or laser melting or electron beam melting). In laser sintering or laser melting, for example, the area of incidence of a laser beam on a layer of the building material is moved across those positions of the layer which correspond to the object cross-section of the object to be produced in this layer.

The published international application WO 2008/145316 A2 mentions diverse problems that have to be overcome in an additive manufacture of objects, in particular in a laser sintering method. On the one hand, the method is time-consuming, as all positions to be solidified have to be individually accessed by the laser. Furthermore, the acquisition and service of a high-energy laser are expensive. Finally, high laser energies is lead to the situation that elaborate cooling solutions for the laser and the beam deflection units have to be found. WO 2008/145316 A2 suggests lowering the energy amount necessary for a solidifying scanning of the building material by increasing the absorptance of the building material by scanning it with laser radiation before the solidification. In particular, it is proposed to supply the energy that is necessary for a solidification areally to the building material by means of a radiant heater panel.

The areal supply of the energy that is necessary for a solidification of the building material allows for a variation of the energy input within the region to be solidified only to a very limited extent. However, different object geometries can make it necessary that not all positions of the object cross-section are treated in the same way when being solidified. Therefore, the object of the present invention is to provide a method and a device by means of which differing local requirements can be specifically taken into consideration in the additive manufacturing of objects.

The object is achieved by a computer-based method of providing control data according to claim 1, an additive manufacturing method according to claim 9, a device for providing control data according to claim 10, a device for a control of an energy input unit according to claim 11, an additive manufacturing apparatus according to claim 12 and a computer program according to claim 15. Further developments of the invention are claimed in the dependent claims. In particular, a device according to the invention may also be developed further by features of the methods according to the invention as set out below or in the dependent claims and vice versa. Furthermore, the features described in connection with one device can also be used for the further development of another device according to the invention, even if this is not explicitly stated.

SUMMARY OF THE INVENTION

An inventive computer-based method of providing control data for an additive manufacturing apparatus for manufacturing a number of three-dimensional objects, wherein by means of the additive manufacturing apparatus the objects are manufactured by applying a building material containing plastic layer by layer by means of a material application unit and by solidifying the building material by supplying radiation energy to positions in each layer that are assigned to the cross-sections of the objects in this layer by scanning these positions by means of an energy input unit with at least one beam for inputting energy into the building material in accordance with a set of energy input parameters, comprises:
- a first step of accessing computer-based model data of a number of portions of the number of objects to be manufactured,
- a second step, in which a number of data models is generated, each of said number of data models specifying for a building material layer a region to be solidified of said building material layer during the manufacturing of the number of portions,
  wherein the region to be solidified is divided into a first partial region and a second partial region,
  wherein in each data model a solidification scanning, which solidifies the building material, of the positions in the region to be solidified by means of the energy input unit is specified and at the positions of the second partial region, however not at the positions of the first partial region, a repetition scanning with at least one beam is specified, wherein for the repetition scanning the energy input parameters are set such that the temperature of the building material within the area of incidence of the beam on the building material lies above of a melting point of the building material, preferably inside of the melting interval of the building material or above of the same, and
- a third step in which the data models generated in the second step are provided as control data for the integration into a control data set for the additive manufacturing apparatus Additive manufacturing apparatuses and methods to which the present invention relates are in particular those in which energy is selectively supplied to a layer of the building material as electromagnetic radiation or as particle radiation. Here, the radiation impinges on the building material in a working plane, which usually is a plane in which the top surface (thus the side facing the energy input unit) of the layer to which the energy is supplied is located. Here, an energy input device may for example comprise a laser or an electron beam source, wherein a laser is preferred in the context of the present invention due to the building material that is used. In particular, the invention relates to methods and apparatuses in which heat is supplied to the building material by means of radiation such as laser sintering or laser melting and electron beam melting, respectively.

If in this application layers below or above of an object (portion) cross-section are mentioned, this indication of a direction refers to a direction that is substantially perpendicular to the layer planes and perpendicular to the working plane, respectively.

Here, the term "substantially" expresses the fact that in some cases the layer thickness may not be uniform, e.g. the layer thickness may change across the object cross-section. In this connection it is assumed that lower-lying layers are applied earlier in time than the layers lying above and therefore are arranged below the layers lying above.

Here, it should also be remarked that by means of an additive manufacturing apparatus not only one object, but also several objects can be manufactured at the same time. If in the present application the manufacturing of an object is mentioned, then it goes without saying that the corresponding description is applicable in the same way also to additive manufacturing methods and apparatuses in which several objects are manufactured at the same time.

Here, a control data set (often also referred to as control command set) is considered to be is a sequence of instructions to successively apply layers of the building material and to scan with radiation regions of the respective layers corresponding to the cross-section of one or more object (portion)(s) to be manufactured in order to solidify the building material.

In detail, a control data set is based on a computer-based model of the object or the object portions to be manufactured, preferably a CAD model. During the additive manufacturing of objects, the control data set specifies for building material layers the positions at which a solidification of the building material is to be effected by a supply of radiation. Optionally, also the thickness of the respective building material layer is specified. In addition, a control data set may contain information specific to the manufacturing apparatus, for example with regard to the position and orientation of the objects in the additive manufacturing apparatus or with regard to a diameter of an area of incidence of a beam (ray bundle) on the building material. Often, a control dataset also contains data necessary for a control of an energy input unit, by which e.g. the radiant flux per unit area and/or the velocity of movement of the beam across the building material and/or an exposure pattern are specified. Here, the term "beam" is used instead of "ray" in order to express the fact that the diameter of the area of incidence of the radiation on the building material need not necessarily be very small but can also, but can also cover a larger area, in particular when the radiation is incident obliquely on the building material or when radiation is used that shall cover a larger area when impinging on the building material (for example when a line exposure device is used).

In the following, control data related to a single layer are also designated as layer dataset. In the present application, it is particularly assumed that a layer dataset contains a data model of positions to be solidified of a cross-section of one or more object(portion)(s) during the manufacturing method. Such a layer dataset usually is generated by dividing a CAD model of the respective object(portion)(s) to be manufactured into layers (in technical jargon named "slicing"). However, it is also conceivable to extract a two-dimensional representation of the object cross-section/the object cross-section to be solidified in a layer by means of one or more beams from the computer-based CAD model of the object/the objects in a different way.

In the layer dataset, positions corresponding to a cross-section through one or more objects are specified, which positions are to be solidified in the corresponding building material layer. In addition, still further information with regard to the manufacturing of the object cross-section or the object portion cross-sections may be contained, in particular the temporal sequence in which positions corresponding to an object (portion) cross-section are to be solidified, meaning a scan line along which there shall be a solidification. Furthermore, also e.g. the layer thickness or irradiation parameter values such as the diameter or the velocity of movement of an area of incidence of a beam on the building material, etc. can be specified. It has to be emphasized that there exist cases in which a layer data set does not refer to a complete object cross-section but only to a part of the same.

The computer-based model data may, for example, be a model of one or more object portions to be manufactured, which exists e.g. as CAD model or has been converted into the STL format, and does not yet contain information on the slicing into layers for a layer-wise manufacturing. An availability of model data in a GML (Generative Modelling Language) description is also conceivable. Alternatively, the model data may be a number of layer data sets, each of which contains a data model of a region of a building material layer to be selectively solidified during the manufacturing, which region corresponds to a cross-section of the object portion/the object portions. Here, it should be noted that in the present application the term "number" is always to be understood in the sense of "one or more". Moreover, it shall be remarked that the term "object portion" need not necessarily refer to only a part of an object to be manufactured but rather may comprise the whole object to be manufactured.

An access to the model data can be done in such a way that the model data are read from a memory or else are received via a network. Here, the model data of an entire object portion do not necessarily have to be read in at once. It is also possible that there is a longer time interval between the access processes to parts of the model data, for example when parts of the model are read in from a memory (which can also be accessed, for example, from the additive manufacturing apparatus) when needed during a manufacturing process of an object portion and a generated data model then is integrated into the control data set during the manufacturing process. Thus, an additive manufacturing apparatus may itself generate/change the control dataset for its control based on the method according to the invention.

In particular, when model data that are accessed in the first step do already comprise a number of layer datasets, the generation of at least one data model in the second step may be a change of a number of data models already existing in the model data. Otherwise, a data model of a building material layer (or of a part thereof) may be generated for the first time in the second step.

By the generation of a data model in the second step, a value of at least one energy parameter is assigned to each position to be solidified of the number of portions of the number of objects in the corresponding building material layer. Possible energy input parameters in the set of energy input parameters are the energy density, meaning the amount of radiation energy per unit area of a beam directed onto the building material for a solidification of the same, the power output of the radiation source that serves for generating the beam (e.g. a (pumped) laser source), the radiant flux per unit area in a beam directed onto the building material for a solidification of the same, the local distribution of the energy per unit area or of the radiant flux per unit area within the area of incidence of the beam on the building material, the velocity of movement of a beam across the building material, the frequency of energy inputs at a position, when a laser is used as radiation source, the pulse duration and/or frequency of the laser pulses, the size and shape of the area of incidence of the radiation on the building material, etc. Furthermore, a further energy input parameter is the distance between two positions in a layer at which energy is input sequentially. The smaller the distance the larger the mutual interaction of both positions.

In the solidification scanning specified in the second step, the amount of energy supplied to the building material is such that by the resulting heating of the building material, the constituents of the building material (for example the powder grains) are connected to each other and after a cooling-down the building material exists as solid body. Preferably, due to the energy supply a melting point of the building material is exceeded, so that the solid body to be manufactured has a high mechanical stability. Here, it shall be mentioned that in particular for building materials which exist only in a semi-crystalline state, the melting process will occur within a temperature interval (the melting interval). Usually, the mechanical properties of the objects that are manufactured are the better the higher the temperature when they are scanned. Therefore, the energy input parameters for the solidification scanning are set such that the temperature of the building material lies at least within, however preferably above, of an existing melting interval.

In the repetition scanning the energy input parameters are set such that the temperature of the building material inside of the area of incidence of the beam on the building material lies above of a melting point of the building material. If the building material has a melting interval instead of an exact melting point, in the repetition scanning the temperature of the building material inside of the area of incidence should lie at least above the lower limit temperature of the melting interval. In particular, also in the repetition scanning the energy input parameters may be set such that the temperature of the building material lies above of an existing melting interval.

A melting point and a melting interval, respectively, usually are known for a specific building material. Knowledge about the melting point and a melting interval, respectively, of the building material that is used are necessary in order to be able to determine the process window for the additive manufacturing. For example, in selective laser sintering (SLS), this process window is also named sintering window. Here, the sintering window usually is defined as temperature range between the onset temperature of the melting process during heating up ($Tm_{on}$) and the onset temperature of the crystallization process when cooling down ($Tc_{on}$). Here, for a more detailed explanation it is referred to WO 96/06881 A2 oder U.S. Pat. No. 6,136,948. The onset temperature of the melting process during heating up ($Tm_{on}$) can be considered to be the temperature at which the melting process starts, while the onset temperature of the crystallization process when cooling down ($Tc_{on}$) can be considered to be the temperature at which a crystallization starts when cooling down.

During the solidification of the building material, the temperature of the building material should lie above of the process window or the sintering window. Due to the definition of the sintering window it automatically results that the temperature of the building material in a solidifying irradiation should lie above of the onset temperature of the melting process when heating up ($Tm_{on}$).

For a successful manufacturing of objects by means of an additive manufacturing method, the process are sintering window should be known. Usually, the respective information is provided by the supplier of a building material. If this should not be the case, the sintering window (process window) can be determined by means of a thermal analysis, in particular by means of differential scanning calorimetry (DSC). The exact procedure is described in ISO 11357-1 and ISO 11357-3.

The area of incidence of the radiation and of the beam, respectively, on the building material can be defined e.g. as region, inside of which more than a predefined percentage of the maximum radiant flux per unit area in a beam impinges on the building material. On the other hand, the area of incidence of the radiation can also be considered as area of the working plane inside of which the incident radiant flux per unit area leads to an exceeding of the lower limit temperature of an existing melting interval of the building material or of a melting point of the same. Different definitions are possible.

The temperature of the building material within the area of incidence of the beam can be obtained by measurements (e.g. by means of an IR camera or a pyrometer). Based on pre-tests with the building material to be used and/or the additive manufacturing apparatus to be used it can be made sure that the energy input parameters specified for the repetition scanning result in the temperature of the building material within the area of incidence of the beam on the building material lying above of a melting point of the building material.

The provision of the at least one data model generated in the second step for the generation of a control dataset can e.g. be implemented by an integration of the at least one data model into a control dataset for the additive manufacturing apparatus. However, a provision also covers a transfer of the at least one data model to a data processing apparatus which integrates the at least one data model into a control dataset or a direct transfer to an additive manufacturing apparatus. In particular, during a manufacturing process in the additive manufacturing apparatus, it is possible to dynamically provide data models for object (portion) cross-sections that are still to be manufactured. In particular, data models generated according to the invention need not be provided individually for an additive manufacturing process. Rather, also several data models can at first be collected and then be provided as a whole for an integration into a control dataset.

It should still be remarked that the control data provided for the generation of a control dataset may on the one hand consist of the at least one data model itself that was generated in the second step, but that on the other hand the at least one data model may still be formatted in correspondence with possible format requirements for the integration into the control dataset.

Preferably, the method is applied in conjunction with the additive manufacturing of objects from a building material containing plastic, which building material is preferably in powder form. For example, the building material in powder form can contain at least one of the polymers selected from the following group of polymers: polyether imides, polycarbonates, polyphenylene sulfones, polyphenylene oxides, polyether sulfones, acrylonitril-butadiene-styrene copolymers, polyacrylates, polyester, polyamides, polyaryletherketones, polyethers, polyurethanes, polyimides, polyamide-imides, polyolefins, polystyrenes, polyphenylene sulphides, polyvinylidene fluorides, polyamide elastomers such as polyether block amides as well as copolymers that contain at least two different monomer units of the before-mentioned polymers. Suitable polyester polymers or copolymers may be selected from the group consisting of polyalkylenterephthalates (e.g. PET, PBT) and copolymers of the same. Suitable polyolefin polymers can be selected from the group consisting of polyethylene and polypropylene. Suitable polystyrene polymers or copolymers can be selected from the group consisting of syndiotactic and isotactic polystyrenes. In addition or alternatively, the building material in powder form can contain at least one polymer blend based on at least two of the before-mentioned polymers and copolymers. Here, with the plastic as matrix, still other additives such as free-flowing agents, fillers, pigments, etc. may be present.

As according to the invention in the second step the region to be solidified is divided into a first and a second partial region, it is possible to selectively supply additional energy to the region to be solidified in the repetition scanning. As such a repetition scanning is specified in the second partial region, it is possible to specifically supply more energy only to those positions at which this is necessary for a high object quality out of diverse reasons. By the repetition scanning, a post-sintering (post-solidification) of already scanned positions can occur as the temperature of the building material is kept above of a melting point, whereby a more complete melting of the building material is made possible. At the same time this provides for a better adhesion of the following applied layer as the newly applied non-solidified powder impinges on low-viscosity, possibly at least partially molten, building material.

As according to the invention the repetition scanning is specified only in a part of the region to be solidified, time is saved when the object is manufactured. In particular, when the first partial region comprises those positions of the region to be solidified at which the solidification scanning is sufficient for an acceptable object quality, an energy input that is too high can be avoided at these positions of the first partial region. Here, it should be taken into consideration that for building material containing plastic care must be taken that due to an energy input there does not occur a decomposition of the building material.

Preferably, in the second step a data model is generated for all layers that contain regions to be solidified corresponding to the object portion.

Preferably, in the control data set for at least one building material layer a, preferably adjustable, waiting time depending on the building material is specified, wherein after the scanning of all positions in the region (51) to be solidified that are specified in the data model, it is waited for the waiting time to pass, before the material application unit is driven to apply a further building material layer.

In each additive manufacturing apparatus a certain system-inherent time passes between the scanning of the last position to be solidified of a building material layer and the application of a new building material layer. This is due to the data processing speed in the additive manufacturing apparatus or a data processing device connected to it and due to the response time of the mechanic in the layer application device, respectively. In comparison to that, the specified waiting time is a time for which it is additionally waited before a new building material layer is applied in order to let an existent tempering unit (e.g. a panel heating that is anyhow present for a pre-heating of the powder) act on positions of the building material layer at which a solidification scanning was already carried out. Of course, according to the invention it is also possible to make a system-inherent time correspondingly longer instead of or additionally to the introduction of an explicit additional waiting time, e.g. by making slower a data processing speed and/or a velocity of movement of the layer application device. Preferably, the waiting time is adjustable (meaning modifiable) in order to be thus able to adapt the waiting time to different building materials. By way of example, the waiting time is equal to or larger than 7 seconds and/or equal to or smaller than 30 seconds.

During the waiting time, a post-sintering (post-solidification) of positions that were already scanned may occur as the radiation from the tempering unit keeps the temperature of the building material above of a melting point, whereby a more complete melting of the building material is made possible. In the repetition scanning according to the invention, a post-solidification may be done only at some positions of the region to be solidified. Compared to a post-solidification only by means of an areal tempering unit, a more specific post-solidification can be effected in that way. In particular, a post-solidification by means of the repetition scanning can assist a post-solidification by means of a tempering unit, whereby an overheating of positions due to a tempering unit acting globally onto the building material layer can be avoided.

Further preferably, in the second step the division into a first partial region and a second partial region is made such that the second partial region comprises all those positions to be solidified at which a temporal difference between the time of the solidification scanning of the respective position and the end of the waiting time is lower than a minimum time.

By the just-described approach, advantage is taken of the fact that the tempering unit is able to act on scanned positions already during the solidification scanning process. Thereby it becomes possible to make the waiting time during which the tempering unit acts on the building material shorter, because the tempering unit need only act on it a minimum time that is smaller than a standard waiting time when no repetition scanning is applied.

Preferably, in the second step the division of the region to be solidified into a first partial region and a second partial region is made such that in the solidification scanning positions in the second partial region are scanned later in time than positions in the first partial region.

By the just-described approach, specifically those positions are subjected to a repetition scanning that were most recently scanned in the (sequential) solidification scanning. Preferably, this applies to at least 80% of the positions in the second partial region, further preferably to all positions in the second partial region. Thus, the repetition scanning acts specifically at those positions at which the time which the tempering unit acted on the building material is smaller than at the other positions (namely those in the first partial region). Thereby, the waiting time after the solidification scanning of all positions of the region to be solidified can be kept small.

Preferably, the energy input parameters in the repetition scanning are set such that the energy input per unit area is more than 25%, more preferably more than 30%, even more preferably more than 40%, and/or less than 60%, more preferably less than 55%, even more preferably less than 50% of the energy input per unit area in the solidification scanning.

It turned out that the mentioned percentages are sufficient for most building materials in order to keep the temperature in the area of incidence of the beam above of a melting point of the building material.

Preferably, for the movement of the at least one beam across the building material in the repetition scanning, a higher scan velocity is specified than in the solidification scanning.

By this modification of the method, it is possible to set a smaller energy input for the repetition scanning as compared to the solidification scanning by a higher scanning velocity.

This has the additional advantage that the repetition scanning can be carried out faster, whereby the manufacturing time of the objects is made shorter.

Preferably, in the second step in at least one data model the first partial region is selected such that it is located on a contour of an object cross-section.

By this approach, it is possible, specifically inside of the object, to provide for a melting of the building material that is as complete as possible by the repetition scanning, from which good mechanical parameters result without an increased adhesion of building material that is not to be solidified at the object due to the repetition scanning as it may occur at the contour of an object cross-section.

Preferably, in the second step (S2), the second partial region (51b) is defined such that it lies inside of a predefined distinguished portion of an object for which a minimum value of a mechanical parameter, in particular an elongation at break and/or a density and/or a tensile strength and/or Young's modulus, is specified.

By the approach, it is possible to provide for a melting of the building material that is as complete as possible specifically at those positions at which there are higher demands on the mechanical properties in terms of minimum requirements for mechanical parameters.

In an inventive additive manufacturing method for manufacturing a number of three-dimensional objects, wherein the objects are manufactured by applying a building material containing plastic layer by layer by means of a material application unit and by solidifying the building material by supplying radiation energy to positions in each layer that are assigned to the cross-sections of the objects in this layer by scanning these positions by means of an energy input unit with at least one beam for inputting energy into the building material in accordance with a set of energy input parameters, the process of the additive manufacturing method is controlled by a control data set into which the data provided by an inventive method were integrated.

When control data that were provided according to the invention are used in a control dataset which was generated for the control of an additive manufacturing method, in particular the control of a layer-wise additive manufacturing method such as a layer-wise powder melting or sintering method, the manufacturing speed and/or the mechanical properties of the object can be improved.

An inventive device for providing control data for an additive manufacturing apparatus for manufacturing a number of three-dimensional objects, wherein by means of the additive manufacturing apparatus the objects are manufactured by applying a building material containing plastic layer by layer by means of a material application unit and by solidifying the building material by supplying radiation energy to positions in each layer that are assigned to the cross-sections of the objects in this layer by scanning these positions by means of an energy input unit with at least one beam for inputting energy into the building material in accordance with a set of energy input parameters, comprises:
- a data model access unit adapted to access computer-based model data of a number of portions of the number of objects to be manufactured,
- a data model generation unit adapted to generate a number of data models, each of the same specifying for a building material layer a region to be solidified of the respective building material layer during the manufacturing of the number of portions,
- wherein the region to be solidified is divided into a first partial region and a second partial region,
- wherein in each data model a solidification scanning, which solidifies the building material, of the positions in the region to be solidified by means of the energy input unit is specified and at the positions of the second partial region, however not at the positions of the first partial region, a repetition scanning with at least one beam is specified, wherein for the repetition scanning the energy input parameters are set such that the temperature of the building material within the area of incidence of the beam on the building material lies above of a melting point of the building material, preferably inside of the melting interval of the building material or above of the same, and
- a control data provision unit adapted to provide data models generated by the data model generation unit as control data for the integration into a control data set of the additive manufacturing apparatus.

The provision of the data model that has been generated in the second step for the generation of a control dataset can be effected by the control data provision unit itself in that the same integrates the generated data model into a control dataset for the additive manufacturing apparatus. Here, a provision also comprises a transfer of the data model to a data processing device which integrates the data model into a control dataset or a direct transfer to an additive manufacturing apparatus. In particular, it is possible to dynamically provide data models for object cross-sections that are still to be manufactured to an additive manufacturing apparatus during a manufacturing process in the same. In particular, data models generated in the second step need not be provided individually for an additive manufacturing process. Rather, also several generated data models can at first be collected and then be provided as a whole for an integration into a control dataset.

An inventive device for a computer-based control of an energy input unit of an additive manufacturing apparatus for the manufacturing of a number of three-dimensional objects by means of the latter,
- wherein by means of the additive manufacturing apparatus the objects are manufactured by applying a building material containing plastic layer by layer by means of a material application unit and by solidifying the building material by supplying radiation energy to positions in each layer that are assigned to the cross-sections of the objects in this layer by scanning these positions by means of an energy input unit with at least one beam for inputting energy into the building material in accordance with a set of energy input parameters, is adapted to:
- specify for each of a number of building material layers a region to be solidified of the building material layer during the manufacturing of a number of portions of the number of objects,
- wherein the region to be solidified is divided into a first partial region and a second partial region,
- wherein in each case, a solidification scanning, which solidifies the building material, of the positions in the region to be solidified by means of the energy input unit is specified and at the positions of the second partial region, however not at the positions of the first partial region, a repetition scanning with at least one beam is specified,
- wherein for the repetition scanning the energy input parameters are set such that the temperature of the building material within the area of incidence of the beam on the building material lies above of a melting point of the building material, preferably inside of the melting interval of the building material or above of the same.

The device for a computer-based control of an energy input unit can be implemented exclusively by software components, by a mixture from hardware and software components or even exclusively by hardware components. In particular, for the manufacturing of a three-dimensional object, a device that is exclusively implemented by software components can interact with a control unit in an additive manufacturing apparatus or be integrated in such a control unit. By means of the device for a computer-based control of an energy input unit, the part homogeneity of objects to be manufactured by an additive manufacturing method can be improved. The device can in particular implement a manufacturing of objects by means of an additive manufacturing method based on a control dataset that was generated by means of an inventive method of providing control data.

An inventive additive manufacturing apparatus for the manufacturing of a number of three-dimensional objects, wherein in the additive manufacturing apparatus the objects are manufactured by applying a building material containing plastic layer by layer by means of a material application unit and by solidifying the building material by supplying radiation energy to positions in each layer that are assigned to the cross-sections of the objects in this layer by scanning these positions by means of an energy input unit with at least one beam for inputting energy into the building material in accordance with a set of energy input parameters, comprises:
  a material application unit adapted to apply a layer of a building material onto an already existing, preferably already selectively solidified, building material layer and
  an energy input unit adapted to scan by means of at least one, beam positions assigned to the cross-section of the object in a layer,
  wherein the additive manufacturing apparatus comprises an inventive device for a computer-based control of an energy input unit of an additive manufacturing apparatus for the manufacturing of a number of three-dimensional objects by means of the latter and/or is connected in signal terms to an inventive device for a computer-based control of an energy input unit of an additive manufacturing apparatus for the manufacturing of a number of three-dimensional objects by means of the latter.

Here, an energy input unit can comprise a number of radiation sources for generating radiation such as electromagnetic radiation or particle radiation as well as a number of beam redirection or beam deflection units connected thereto for directing the radiation onto the building material. Preferably, radiation from exactly one beam deflection unit impinges on the building material in an area of incidence. The radiation sources may for example be one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers.

When the control data are generated in the additive manufacturing apparatus, it is in particular possible that the same dynamically generates data models of object (partial) cross-sections that are still to be manufactured by means of the data model generation unit during a manufacturing process.

Preferably, the inventive additive manufacturing apparatus further comprises a tempering device adapted to maintain building material that has already been scanned by a beam at a temperature above of a melting point of the building material, preferably inside of the melting interval of the building material or above of the same.

A tempering unit is an irradiation device that is able to input the electromagnetic radiation into a building material layer in order to supply energy to the same independently of an existing energy input unit. Preferably, the radiation of the tempering unit acts on the building material over an extended period. In other words, the tempering unit is not switched off during the time of the solidification scanning. As to some extent already mentioned further above, by means of the tempering unit a post-solidification of positions already scanned during the solidification scanning can be effected. While such a post-solidification is utilized also in the prior art mentioned in the introduction after at first only the absorption characteristics were changed with a laser beam, the inventors have found that the insertion of a waiting time surprisingly has a positive effect on the object properties also in those cases in which by the scanning with a beam the building material was already solidified, in particular was already completely melted. The inventors' explanation for this is that the effect of the radiation of the tempering unit on the building material counteracts a cooling-down of the exposed regions that is too large before the next building material layer is applied. In particular, the radiation of the tempering unit has the effect that when a new layer with still cold building material is applied, the latter gets into contact with a low-viscosity hot melt of the already existing layer, which leads to a better inter-penetration of cold and hot material. In particular, due to the use of a tempering unit, the energy input in the solidification scanning can be lowered, whereby an overheating, in particular a damage to the building material due to a heat input that is too high, can be avoided.

Further preferably, in the inventive additive manufacturing apparatus the tempering device is a radiant heater, which preferably is adapted to input radiant energy into the building material areally in a working plane of the additive manufacturing apparatus, in which working plane the building material is scanned by the at least one beam.

Here, a radiant heater is in particular an irradiation device that is able to input the electromagnetic radiation, in particular infrared radiation, areally into a building material layer. Areally here means that the area of incidence of the radiation on the building material has a minimum diameter of 1000 μm in each of two directions that are in parallel to the building material layer and the working plane, respectively, and are perpendicular to each other. Preferably, the radiant heater is able to irradiate at the same time at least 10% of the construction field, preferably at least 20% of the construction field, further preferably at least 50% of the construction field. By the areal energy input it is in particular also possible to let the radiant heater stationarily irradiate a certain region of the construction field, whereby the control of the tempering unit is very simple. In particular, a radiant heater used for a pre-heating of the building material up to a process temperature inside of a process or sintering window can additionally be used as tempering unit.

An inventive computer program has program code means for executing all the steps of an inventive computer-based method of providing control data for an additive manufacturing apparatus for manufacturing a number of three-dimensional objects method or an inventive additive manufacturing method when the computer program is executed by means of a data processor, in particular a data processor interacting with an additive manufacturing apparatus.

"Interacting" means here that the data processor either is integrated into the additive manufacturing apparatus or is able to exchange data with it. The implementation of the inventive method of providing control data as well as the implementation of the corresponding device by means of software makes an easy installability on different computing systems at different locations possible (for example at the creator of the design of the object or else at the operator of the additive manufacturing apparatus).

BRIEF DESCRIPTION OF THE DRAWINGS

Further features and practicalities of the invention will arise from the description of embodiments based on the attached drawings.

DETAILED DESCRIPTION OF THE EMBODIMENTS

Figure 1:
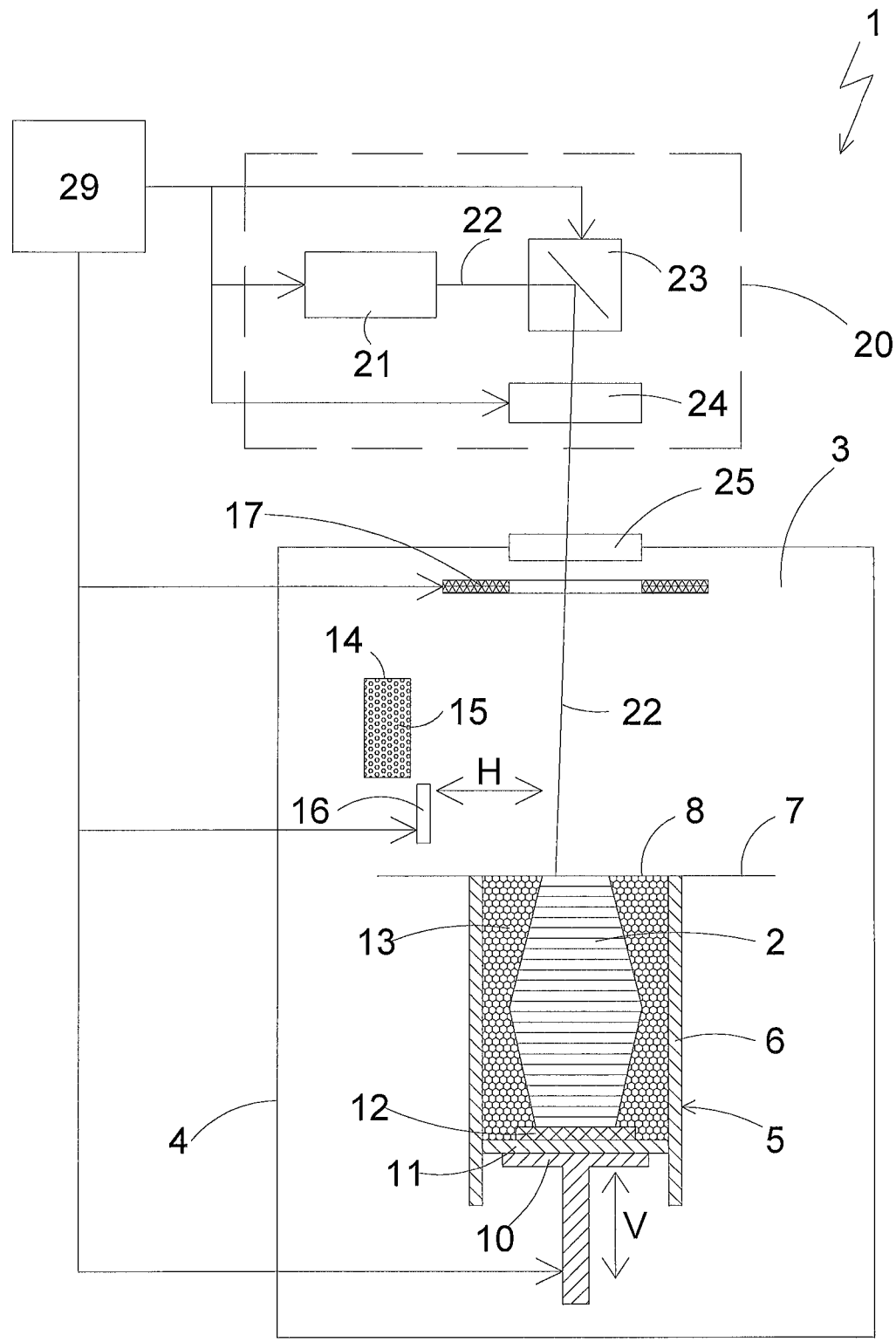
FIG. 1 shows a schematic, partially sectional view of an exemplary apparatus for an additive manufacturing of a three-dimensional object according to an embodiment of the invention.

For a description of the invention, in the following at first an inventive additive manufacturing apparatus shall be described with reference to FIG. 1 using the example of a laser sintering or melting apparatus.

For building an object 2, the laser sintering or laser melting apparatus 1 comprises a process chamber or build chamber 3 having a chamber wall 4. A build container 5 which is open at the top and which has a container wall 6 is arranged in the process chamber 3. The top opening of the container 5 defines a working plane 7, wherein the area of the working plane 7 located within the opening, which area can be used for building the object 2, is referred to as build area 8.

In the build container 5, a support 10 is arranged that can be moved in a vertical direction V and to which a base plate 11 is attached which seals the container 5 at the bottom and thus forms the bottom thereof. The base plate 11 can be formed as a plate separately from the support 10, which plate is fixed to the support 10, or it can be integrally formed with the support 10. Depending on the powder and process used, a building platform 12 as building support can be additionally arranged on the base plate 11, on which building platform 12 the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering or melting device 1 further comprises a storage container 14 for a building material 15, in this example a powder that can be solidified by electromagnetic radiation, and a recoater 16 as material application device that can be moved in a horizontal direction H for applying the building material 15 within the build area 8. Optionally, a heating device, e.g. a radiant heater 17, can be arranged in the process chamber 3, which heating device serves for a heating of the applied building material. For example, an infrared heater may be provided as radiant heater 17.

The exemplary layer-wise additive manufacturing apparatus 1 further comprises an energy input unit 20 having a laser 21 generating a laser beam 22 that is deflected by a deflection device 23 and focused by a focusing device 24 on the working plane 7 through a coupling window 25 that is arranged at the top side of the process chamber 3 in the chamber wall 4.

In laser sintering or laser melting, an energy input unit can comprise for example one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers. Therefore, the specific setup of a laser sintering or melting device shown in FIG. 1 is only exemplary for the present invention and can of course also be modified, especially when using an energy input unit different from the one shown. In order to make it clear that the shape of the area of incidence of the radiation on the building material need not necessarily be approximately point-shaped, but may also be two-dimensional, in this application the term "beam" is often used synonymously with "ray bundle".

Furthermore, the laser sintering apparatus 1 comprises a control unit 29 by which the individual components of the apparatus 1 can be controlled in a coordinated manner in order to implement the building process. Alternatively, the control unit can also be arranged partially or completely outside of the additive manufacturing apparatus. The control unit can comprise a CPU, the operation of which is controlled by a computer program (software). The computer program can be stored separately from the additive manufacturing apparatus on a storage device from where it can be loaded (e.g. via a network) into the additive manufacturing apparatus, in particular into the control unit.

In operation, the control unit 29 lowers the carrier 10 layer by layer, it activates the recoater 16 to apply a new powder layer and the deflection device 23 and, if necessary, also the laser 21 and/or the focusing device 24 to solidify the respective layer at the positions corresponding to the respective object by means of the laser by scanning these positions with the laser.

In the additive manufacturing apparatus just described as an example, a manufacturing process is carried out in such a way that the control unit 29 processes a control data set.

For each point in time during the solidification process, the control data set instructs an energy input unit, in the case of the above laser sintering or laser melting apparatus specifically the deflection device 23, to which position on the working plane 7 the radiation is to be directed.

In particular in the first embodiment of the invention described further below, the manufacturing process proceeds such that a radiant heater 17 which is present in the additive manufacturing apparatus is used as tempering unit. In detail, after the laser radiation has been directed to all positions to be solidified of a building material layer, a waiting time is specified within which the building material layer is exposed to the radiation emitted by the radiant heater 17. By the action of the radiation emitted by the radiant heater 17 acting as tempering unit, the mechanical properties of the manufactured objects are improved. The specified waiting time, which is also designated as post-sintering time, depends on the building material and on the setup of the additive manufacturing apparatus that is used and lies for example in a range between 5 and 30 seconds.

Figure 7:
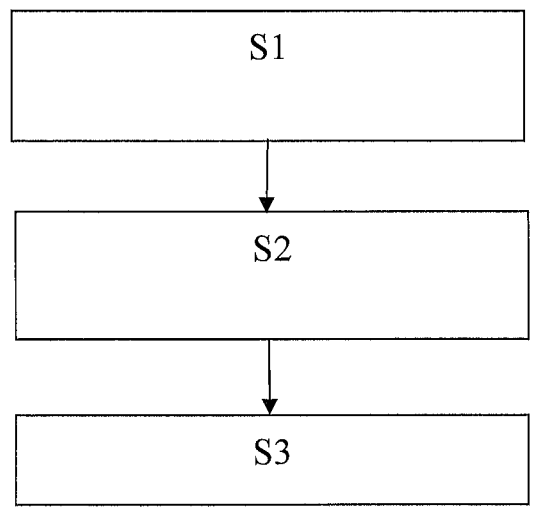
FIG. 7 illustrates the process flow of an embodiment of an inventive method of providing control data.
Figure 8:
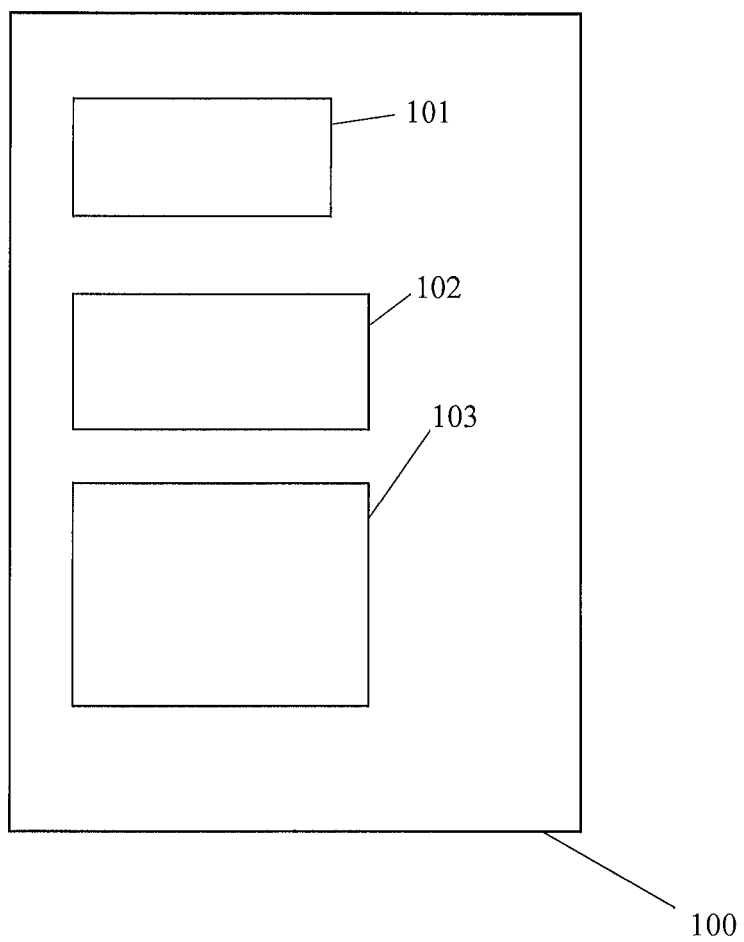
FIG. 8 shows the schematic setup of an embodiment of an inventive device for providing control data.

As shown in FIG. 8, a device 100 for providing control data for an additive manufacturing apparatus contains a data access unit 101, a data model generation unit 102 and a data model provision unit 103. An example of the operating mode of the device 100 for providing control data will be described by making reference to FIG. 7.

In the device 100 for providing control data for an additive manufacturing apparatus that is shown in FIG. 8, the data access unit 101 at first accesses a number of, meaning one or more, layer data sets, each of which comprises a data model of a region to be selectively solidified of a building material layer during manufacture, preferably of the entire region to be solidified of a building material layer, which corresponds to a cross-section of an object portion. In the process flow shown in FIG. 7, this is the first step S1.

In the second step S2 shown in FIG. 7, the data model generation unit 102 now specifies in a data model of a region to be selectively solidified of a building material layer positions to which the laser beam shall be directed and radiation parameters for the laser beam while the laser beam is directed to the individual positions.

Furthermore, also a temporal sequence of the solidification of positions of the building material layer is specified. For example, a movement of the one or more beams that are used in the additive manufacturing apparatus along scan lines across the building material is specified.

Figure 2:
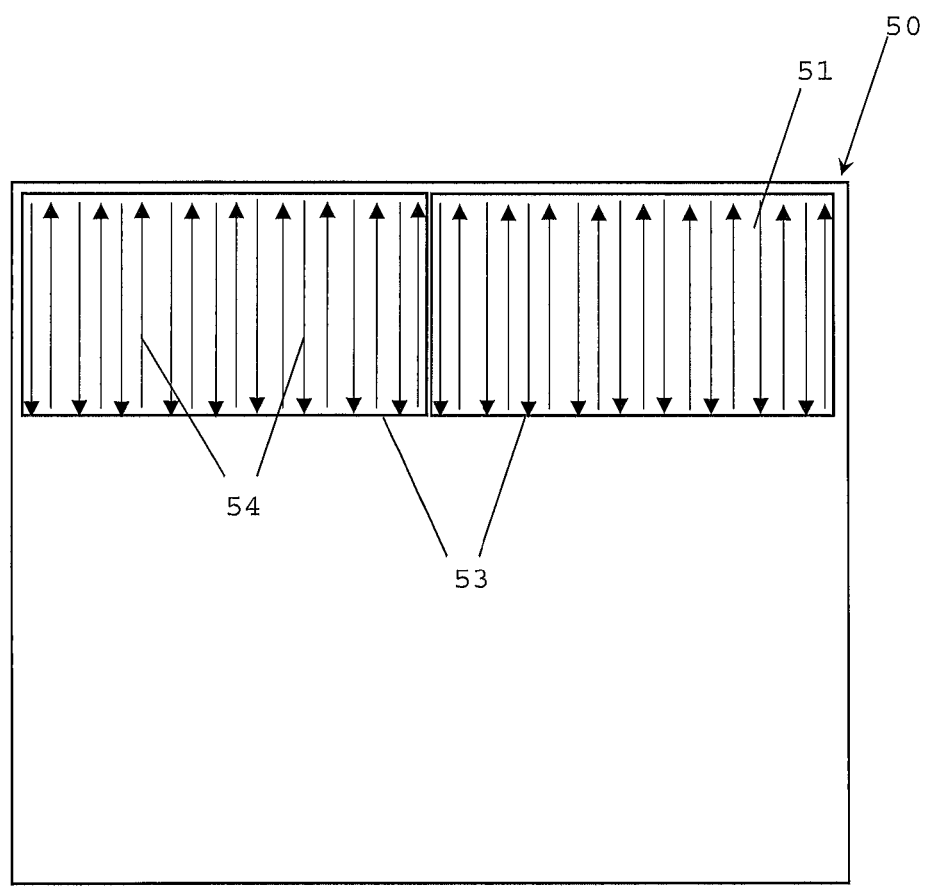
FIG. 2 schematically shows a top view of a cross-section of an object during its manufacture in order to illustrate the different regions of an object cross-section in the context of a first embodiment of the invention.
Figure 3:
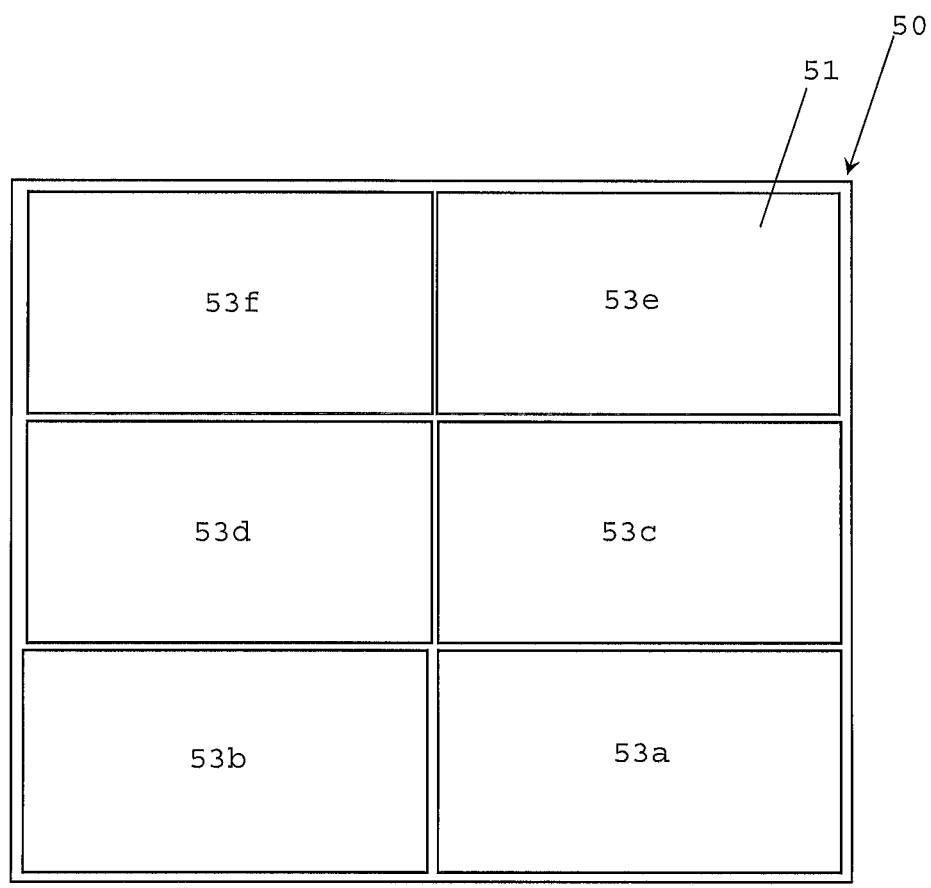
FIG. 3 schematically shows a temporal sequence of the scanning of individual positions for the object cross-section of FIG. 2.
Figure 4:
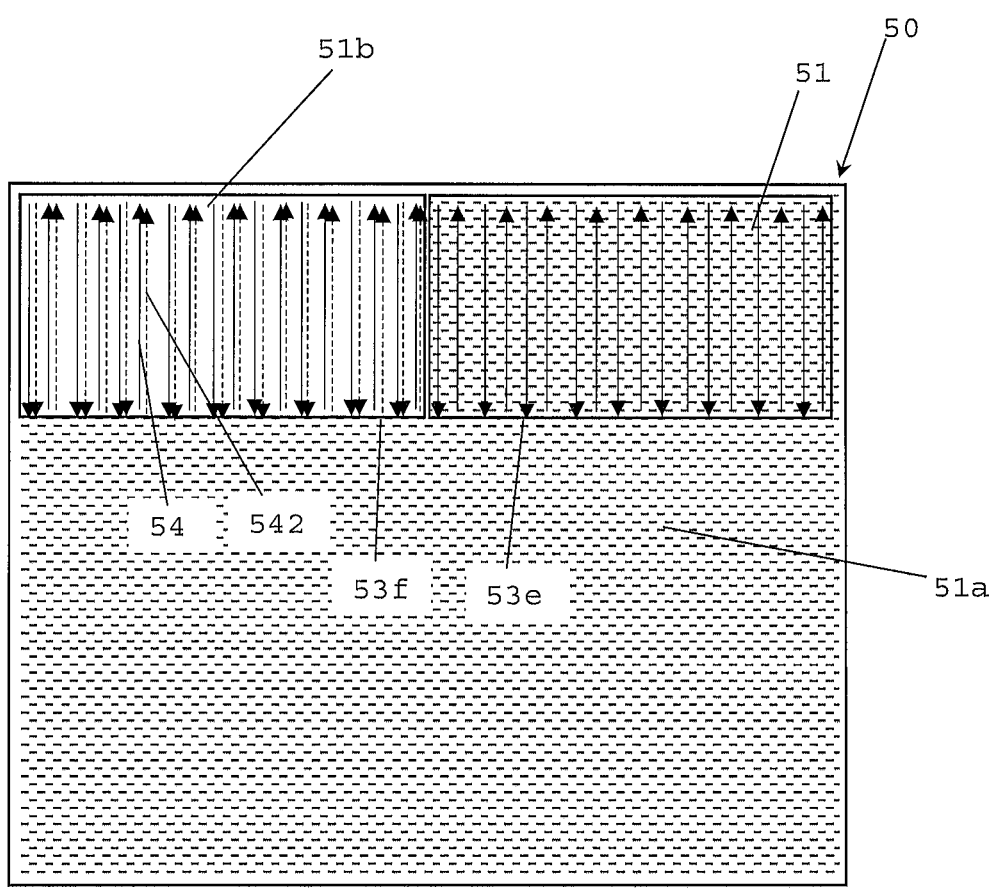
FIG. 4 illustrates the division of the region to be solidified into a first partial region and a second partial region for the object cross-section shown in FIGS. 2 and 3.

FIGS. 2 to 4 show a first embodiment of the detailed approach in the second step. FIG. 2 shows scan regions 53 of an object cross-section 50, which in the example are strip-shaped, i.e. rectangular, and are scanned scan line for scanline by a movement of a beam. In FIG. 2, the region 51 to be solidified, which is identical to the object cross-section 50, is scanned with energy radiation such that the material is solidified area by area, meaning scan region 53 by scan region 53. For a better visualization, FIG. 2 does not show all scan regions 53, but only two. The movement of the beam within the scan regions 53 along scan lines or hatch lines or solidification paths 54, which are parallel to each other, is usually designated as "hatching". The arrows in FIG. 2 shall illustrate the direction of movement of the beam across the building material layer.

One recognizes that in FIG. 2 two neighboring hatch lines or solidification paths 54 are always traversed in opposite directions. Such an approach has advantages in speed as thereby the path of the beam without energy input into the building material (at the turning points of the direction of movement) can be short. However, it is alternatively also possible that all hatch lines are traversed in the same direction.

FIG. 3 shows all scan regions 53*a* to 53*f* to be solidified when the region 51 is solidified. The letters a to f added to the reference numbers shall illustrate the temporal sequence in which the scan regions 53*a* to 53*f* are scanned one after the other with a beam. Thus, in FIG. 3 the scan region 53*a* down to the right is solidified first and the scan region 53*f* up to the left is solidified last.

As shown in FIG. 4, the data model generation unit 102 divides the partial region 51 to be solidified in a first partial region 51*a* and a second partial region 51*b*, which differ from one another in that for the two partial regions there exists a different specification for the scanning with energy radiation. In FIG. 4, the distinction between the two partial regions is indicated by providing the partial region 51*a* with a horizontal dashed hatching in contrast to the partial region 51*b*. One recognizes that the partial region 51*b* consists of the scan region 53*f* and the partial region 51*a* consists of the scan regions 53*a* to 53*e*.

In contrast to the first partial region 51*a*, in the second partial region 51*b* a repeated scanning of the building material with energy radiation is carried out. With regard to this, it is specified in this embodiment that in the entire partial region 51*b* a beam is repeatedly moved along hatch lines across the building material. In FIG. 4, these are the dashed hatch lines provided with reference number 542. In order to illustrate the different procedure in partial regions 51*a* and 51*b*, FIG. 4 also shows the scan region 53*e*, in which there are no hatch lines 542. It shall be emphasized again that the repeated scanning in the second partial region 51*b* according to the invention is always carried out before the application of the next building material layer.

Due to the repeated scanning of the building material in the second partial region 51*b*, which partial region has been chosen such that it is that section of the region 51 to be solidified that was scanned last in the solidification scanning, it is on the one hand possible to improve the object quality in the second partial region 51*b*. In this region, the radiation of the tempering unit cannot act for such a long time onto the building material as in the partial region 51*a*, taking into consideration that the radiation of the tempering unit acts on the building material not only during the specified waiting time but also already during the solidification scanning of the building material. By the repetition scanning, additional energy can be input into the building material specifically in this region. On the other hand, in the approach according to the first embodiment the waiting time can be set to be shorter, in particular shorter than a minimum necessary waiting time (minimum waiting time or minimum time), as in the second partial region 51 that was scanned last, the radiation in the repeated scanning acts in addition to the radiation of the tempering unit on the building material. As a result, the time period needed in total for a manufacturing process becomes shorter.

Preferably, a smaller value is specified for the energy per unit area to be input in the repetition scanning in partial region 51*b* as compared to the energy per unit area input in the solidifying scanning in partial regions 51*a* and 51*b*. This can for example be implemented by a smaller specified value for the radiant flux per unit area in the area of incidence of the beam used in the repetition scanning and/or a higher velocity of movement of the beam across the building material and/or a modified spatial distribution of the radiant flux per unit area within the area of incidence of the beam.

Figure 5:
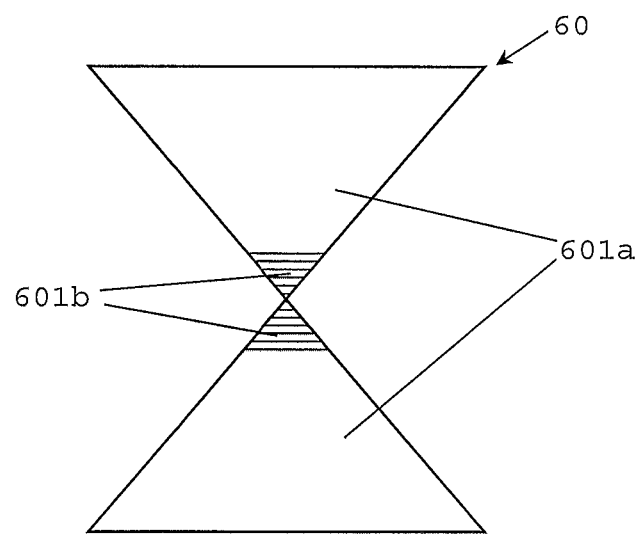
FIG. 5 schematically shows a top view of a cross-section of an object in order to illustrate the approach according to a second embodiment.

In the second embodiment illustrated in FIG. 5, the region to be solidified is not divided into a first partial region and a second partial region based on the temporal sequence in which the individual positions are scanned in the solidification scanning, but based on the different mechanical requirements which different regions in the object to be manufactured must fulfill. With regard to this, FIG. 5 shows a top view of a cross-section 60 to be solidified of an exemplary object. For the example it is assumed that all cross-sections of the object have the same shape and are positioned in the object one over the other without mutual offset.

One immediately recognizes in FIG. 5 that at the bottleneck of the cross-section 60 that is shown, meaning where the cross section in the figure has its smallest horizontal extension, there will occur the highest mechanical load (e.g. due to leveraged forces). Out of this reason, in the second embodiment the region to be solidified is divided into a first partial region 601a and a second partial region 601b that is marked by a horizontal hatching. In contrast to the first partial region 601a, in the second partial region 601b the building material is repeatedly scanned with one or more beams.

Thereby it is possible to provide for a high structural strength of the solidified building material specifically in that part of the object cross-section in which the highest mechanical load will occur at the finished object.

Figure 6:
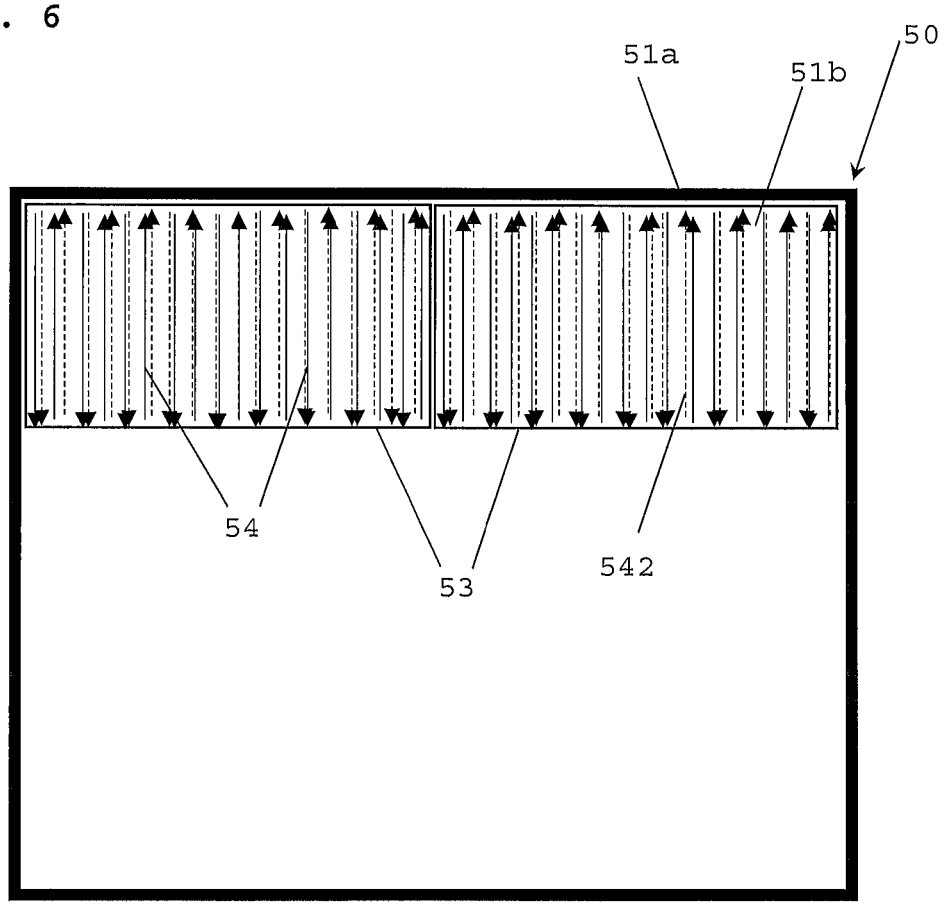
FIG. 6 illustrates a possible approach according to a third embodiment.

FIG. 6 illustrates a third embodiment of the invention and for an illustration shows again the exemplary object cross-section of FIG. 2. For a better visualization, not all scan regions 53 but only two are shown also in FIG. 6. Different from the example of FIG. 2, in the third embodiment in FIG. 6 the region to be solidified is divided into a first partial region 51a encompassing the contour of the object cross-section and a second partial region 51b encompassing the inside of the object cross-section. For the inside of the object cross-section, a higher structural strength is aimed at as compared to the contour region which forms an edge of the completed object. Moreover, in the contour region care must be taken so that by the energy input there is no additional melting of non-solidified building material outside of the object cross-section, which then unintentionally adheres from the outside to the edge of the completed object. In other words, in the contour region the energy input by the radiation should be not too high.

Therefore, in the third embodiment at first a solidification scanning of the first and second partial regions 51a and 51b is carried out, in which the energy supplied to the building material is limited in order to make sure that as few building material as possible is additionally melted outside of the object cross-section. Subsequently, a repetition scanning of the second partial region 51b being identical with the inside of the object cross-section is carried out in order to provide for an increased structural strength in this partial region. This repetition scanning is illustrated in FIG. 6 by dashed hatch lines 542.

Finally, it shall be mentioned that an inventive device 100 for providing control data for an additive manufacturing apparatus can be implemented not exclusively by software components but also exclusively by hardware components or mixtures from hardware and software. In particular, interfaces that are mentioned in the present application need not necessarily be configured as hardware components, but can also be implemented as software modules, for example when the data that are input or output, respectively, can be taken over from other components that are implemented in the same device or need to be transferred to another component only by software. Also, the interfaces could consist of hardware components and software components, such as a standard hardware interface that is specifically configured by software for a specific application. Furthermore, a plurality of interfaces can also be combined in a common interface such as an input-output interface.

The invention claimed is:

1. An additive manufacturing method for manufacturing one or more three-dimensional objects in a single build operation by applying a building material containing plastic in a layer by layer manner where the layers correspond to respective cross sections of one or more of the three dimensional objects that are built by solidifying the building material by supplying radiation energy to positions in each layer that are assigned to the respective cross-sections, the method comprising:
   providing an energy input unit with at least one beam for inputting energy into the building material in accordance with a set of energy input parameters;
   directing the at least one beam to a build surface;
   providing a supply of the building material;
   providing a recoater device that applies the building material over a build area for at least one of the layers;
   accessing computer-based model data of a number of portions of one or more of the three-dimensional objects;
   generating a number of data models, each of the data models specifying for at least one of the layers a region to be solidified during the manufacturing of the number of portions,
   wherein the region to be solidified is divided into at least a first partial region and at least a second partial region; and
   wherein each of the data models specifies a first set of energy input parameters for both the at least first partial region and the at least second partial region, the first set of energy input parameters effecting a solidification scanning that solidifies the building material at positions in the region to be solidified by the energy input unit and each of the data models specifying a second set of energy input parameters for a repetition scanning at positions of the at least second partial region, however not at positions of the at least first partial region;
   performing the solidification scanning that solidifies the building material at positions of the at least first partial region and the at least second partial region by the energy input unit, and performing the repetition scanning at the positions of the at least second partial region by the energy input unit, however not at positions of the at least first partial region, wherein the solidification scanning is performed prior to the repetition scanning and without new building material being applied between the solidification scanning and the repetition scanning during manufacturing of the one or more three-dimensional objects;
   wherein the second partial region comprises those positions of the region to be solidified that are solidified last in the solidification scanning, or wherein the first partial region comprises a contour of the respective object cross-section and the second partial region comprises an inside of the respective object cross-section located within the contour, or wherein the second partial region comprises a predefined distinguished portion of an object for which a minimum value of a mechanical parameter for a completed object is specified; and
   providing the data models as control data in a control data set for manufacturing the one or more three-dimensional objects.

2. The method according to claim 1, wherein in the control data set for at least one of the layers a waiting time is specified, wherein after the scanning of all positions in the region to be solidified that are specified in the data model, the waiting time passes before the recoater device is driven to apply a further building material layer.

3. The method according to claim 2, wherein the step of dividing the region to be solidified into the at least first partial region and the at least second partial region is carried out such that the at least second partial region comprises all the positions in the region to be solidified at which a temporal difference between a time of the solidification scanning of a respective position and an end of the waiting time is lower than a minimum time.

4. The method of claim 2, further comprising a tempering unit in the form of a radiant heater, the radiant heater being operated throughout the build operation and at a level that is inside or above a melting interval of the building material.

5. The method according to claim 1, wherein the step of dividing the region to be solidified into the at least first partial region and the at least second partial region is carried out such that the solidification scanning in the at least second partial region is carried out later in time than the solidification scanning at positions in the at least first partial region.

6. The method according to claim 1, wherein the second set of energy input parameters in the repetition scanning is set such that the energy input per unit area is more than 25% and less than 60% of the energy input per unit area in the solidification scanning.

7. The method according to claim 1, wherein the second set of energy input parameters in the repetition scanning is set such that a movement of the at least one beam across the building material in the repetition scanning has a higher scan velocity than in the solidification scanning specified in the first set of energy input parameters.

8. The method according to claim 1, wherein in at least one data model the at least first partial region is selected such that the at least first partial region is located on the contour of one of the respective cross-sections.

9. The method according to claim 1, wherein the at least second partial region is defined such that the at least second partial region lies inside the predefined distinguished portion of an object for which a minimum value of a mechanical parameter for a completed object is specified.

10. The method according to claim 9, wherein the mechanical parameter is an elongation at break and/or a density and/or a tensile strength and/or a Young's modulus.

11. The method according to claim 1, wherein in the solidification scanning, the building material is subjected to a melting process that occurs within a temperature interval that is a temperature range between an onset temperature of the melting process at which the melting process starts during heating up and an onset temperature of a crystallization process at which a crystallization starts when cooling down, and wherein for the repetition scanning the energy input parameters of the second set of energy input parameters are set such that a temperature of the building material within an area of incidence of the beam on the building material lies at least above the onset temperature of the melting process.

12. An additive manufacturing method for manufacturing three-dimensional objects by applying a building material in a layer by layer manner, where the layers correspond to respective cross-sections of a three dimensional object that is built by solidifying the building material through application of energy to positions in each of the layers that are assigned to the respective cross-sections, the method comprising:
providing an energy input unit with at least one beam for inputting energy into the building material in accordance with a set of energy input parameters;
directing the at least one beam to a build surface;
providing a supply of the building material;
providing a recoater device that applies the building material over a build area for at least one of the layers; and
accessing computer-based data model having data of a number of portions of an object to be manufactured in which a region to be solidified is divided into at least a first partial region and at least a second partial region,
wherein the data model specifies a first set of energy input parameters for both the at least first partial region and the at least second partial region, the first set of energy input parameters effecting a solidification scanning that solidifies the building material at positions in the region to be solidified and specifying a second set of energy input parameters for a repetition scanning at positions of the at least second partial region, however not at positions of the at least first partial region, wherein the second set of energy input parameters is set such that a temperature of the building material within an area of incidence of the at least one beam on the building material lies above a melting point of the building material that was solidified by the solidification scanning;
performing the solidification scanning that solidifies the building material at positions of the at least first partial region and the at least second partial region by the energy input unit, and performing the repetition scanning at the positions of the at least second partial region by the energy input unit, however not at positions of the at least first partial region,
wherein the solidification scanning is performed prior to the repetition scanning and without new building material being applied between the solidification scanning and the repetition scanning during manufacturing of the three-dimensional objects, and
wherein the at least second partial region comprises those positions of the region to be solidified that are solidified last in the solidification scanning, or wherein the at least first partial region comprises a contour of the respective object cross-section and the at least second partial region comprises an inside of the respective object cross-section located within the contour, or wherein the at least second partial region comprises a predefined distinguished portion of an object for which a minimum value of a mechanical parameter for a completed object is specified.

13. An additive manufacturing method for manufacturing one or more three-dimensional objects in a single build operation by applying a building material containing plastic in a layer by layer manner where the layers correspond to respective cross sections of one or more of the three dimensional objects that are built by solidifying the building material by supplying radiation energy to positions in each layer that are assigned to the respective cross-sections, the method comprising:
providing an energy input unit with at least one beam for inputting energy into the building material in accordance with a set of energy input parameters;
directing the at least one beam to a build surface;
providing a supply of the building material;
providing a recoater device that applies the building material in a build area for at least one of the layers;
wherein for at least one layer of the building material, a region to be solidified within the respective layer is divided into a first partial region and a second partial region; and
wherein the method comprises a solidification scanning of the building material at positions of both the first partial region and the second partial region by inputting energy into the building material in accordance with a first set of energy input parameters, and a repetition scanning at the positions of the second partial region, however not at positions of the first partial region, by inputting energy into the building material in accordance with a second set of energy input parameters, wherein the second set of energy input parameters is set such that a temperature of the building material within an area of incidence of the at least one beam on the building material lies above a melting point of the building material that was solidified by the solidification scanning;

wherein a sequence of scanning is such that the solidification scanning is performed prior to the repetition scanning and without new building material being applied between the solidification scanning and the repetition scanning during manufacturing of the one or more three-dimensional objects; and wherein the at least second partial region comprises those positions of the region to be solidified that are solidified last in the solidification scanning, or wherein the at least first partial region comprises a contour of the respective object cross-section and the at least second partial region comprises an inside of the respective object cross-section located within the contour, or wherein the at least second partial region comprises a predefined distinguished portion of an object for which a minimum value of a mechanical parameter for a completed object is specified.

* * * * *